US006488236B2

(12) United States Patent
Landry

(10) Patent No.: US 6,488,236 B2
(45) Date of Patent: Dec. 3, 2002

(54) REMOVABLE HOIST FOR AIRCRAFT

(75) Inventor: Martin Landry, Prevost (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/978,818

(22) Filed: Oct. 15, 2001

(65) Prior Publication Data

US 2002/0020783 A1 Feb. 21, 2002

Related U.S. Application Data

(63) Continuation of application No. 09/290,032, filed on Apr. 9, 1999, now Pat. No. 6,334,590.

(51) Int. Cl.⁷ .............................................. B64D 9/00
(52) U.S. Cl. ............................................... 244/137.1
(58) Field of Search .......................... 244/17.15, 118.1, 244/137.1; 212/176; 414/540

(56) References Cited

U.S. PATENT DOCUMENTS

| 3,088,608 | A |   | 5/1963  | Theodore ..................... 214/77 |
| 3,805,977 | A |   | 4/1974  | Fritzsche et al. .......... 214/86 R |
| 4,170,341 | A |   | 10/1979 | Jacobson ..................... 254/172 |
| 4,566,659 | A |   | 1/1986  | Luckachina ............. 244/137 R |
| 4,750,691 | A |   | 6/1988  | Hollrock et al. .......... 244/137.1 |
| 4,858,855 | A |   | 8/1989  | Dalbera .................... 244/137.1 |
| 5,190,250 | A |   | 3/1993  | DeLong et al. ........... 244/137.1 |
| 5,209,435 | A |   | 5/1993  | Edwards ................... 244/137.2 |
| 5,593,113 | A | * | 1/1997  | Cox ........................ 244/137.1 |
| 5,836,548 | A | * | 11/1998 | Dietz et al. .............. 244/137.1 |

* cited by examiner

Primary Examiner—Robert P. Swiatek
(74) Attorney, Agent, or Firm—James E. Walton; Hill & Hunn, LLP

(57) ABSTRACT

A removable hoisting apparatus for use on an aircraft to hoist cargo and people into the aircraft. The removable hoisting apparatus comprises a base member, a telescoping mast member, a boom member, and a hoist assembly carried by the boom member. The base member is of negligible weight and is adapted for attachment to the floor of the aircraft. The telescoping mast member has a bottom portion and a top portion. The bottom portion is releasably connected to the base member, and the top portion is releasably connected to the bottom portion. The top portion extends through an opening in the aircraft. A shoulder member is connected to the top portion, and a boom member is connected to the shoulder member. A rigid link member connects the boom member to the aircraft. The removable hoisting apparatus can be quickly removed from the aircraft by releasing only three quick-release fasteners, leaving only the base member attached to the aircraft.

20 Claims, 3 Drawing Sheets

REMOVABLE HOIST FOR AIRCRAFT

This application is a continuation of application Ser. No. 09/290,032, filed on Apr. 9, 1999, titled "Removable Hoist for Aircraft," which issued under U.S. Pat. No. U.S. 6,334, 590 B1 on Jan. 1, 2002.

BACKGROUND ART

1. Field of the Invention

The present invention relates generally to an aircraft hoist apparatus for loading cargo into the aircraft and lifting people into the aircraft in rescue operations. In particular, the present invention relates to an aircraft hoist apparatus that can be quickly and easily released and removed from the aircraft.

2. Description of Related Art

Devices for hoisting cargo into aircraft are well known in the art. Often, these devices take up a substantial portion of the cabin of the aircraft, or create a substantial obstruction within the aircraft. U.S. Pat. No. 3,088,608 to Theodore, and U.S. Pat. No. 3,805,977 to Fritzsche et al. are examples of two such devices. The cargo compartment of the aircraft is substantially obstructed while these devices are in use.

Many hoisting devices involve complicated structures that pivot and fold over onto themselves to save space. Typical examples of such devices can be found in U.S. Pat. No. 4,750,691 to Hollrock et al., U.S. Pat. No. 4,858,855 to Dalbera, and U.S. Pat. No. 5,209,435 to Edwards. These devices are bulky and add a substantial amount of weight to the aircraft or structure to which they are attached.

Although some hoisting devices are lightweight, they are not conducive to quick and is easy installation and removal from the aircraft or structure to which they are attached. For example, U.S. Pat. No. 4,566,659 to Luckachina discloses a pivotable support rescue hoist that is attached to a helicopter. Although the Luckachina hoist pivots to allow access to engine compartments, it is not designed to be removed from the aircraft. Similarly, U.S. Pat. No. 5,190,250 to DeLong et al. does not allow quick and easy removal of its winch subassembly from the aircraft.

Despite these advances in the art, there continues to be a need for a removable hoist apparatus for an aircraft that can be quickly and easily removed from the aircraft.

BRIEF SUMMARY OF THE INVENTION

There is a need for a removable hoist apparatus for use on an aircraft that can be quickly and easily installed and removed from the aircraft, that does not require substantial modification to the aircraft, and that adds only negligible weight to the aircraft when the removable hoist is removed. The hoist can be used to load cargo into the aircraft or to lift people into the aircraft during rescue operations.

It is an object of the present invention to provide a removable hoist apparatus for an aircraft that can be quickly and easily removed from the aircraft by releasing only three quick-release fastening means. When the removable hoist apparatus is removed from the aircraft, the components of the apparatus that are permanently attached to the aircraft are of negligible weight relative to the weight of the aircraft.

It is another object of the present invention to provide a removable hoist apparatus for an aircraft that only minimally obstructs the view from within the aircraft when the hoist apparatus is installed and being operated.

It is another object of the present invention to provide a removable hoist apparatus that can be installed on existing aircraft as a retrofit component.

A principle advantage of the present invention is that not only can a hoist apparatus be quickly and easily installed in an aircraft for loading cargo and rescuing people, but the hoist apparatus can be quickly and easily removed from the aircraft, leaving only component parts of negligible weight in the aircraft.

Another advantage of the present invention is that it attaches to the aircraft at only two points, and the removable hoist apparatus can be installed and removed by simply releasing three quick-release fastening means.

The above, as well as, additional objects, features, and advantages of the present invention will become apparent in the following detailed description.

DETAILED DESCRIPTION OF THE PREFERRED EMBODIMENT

Figure 1:
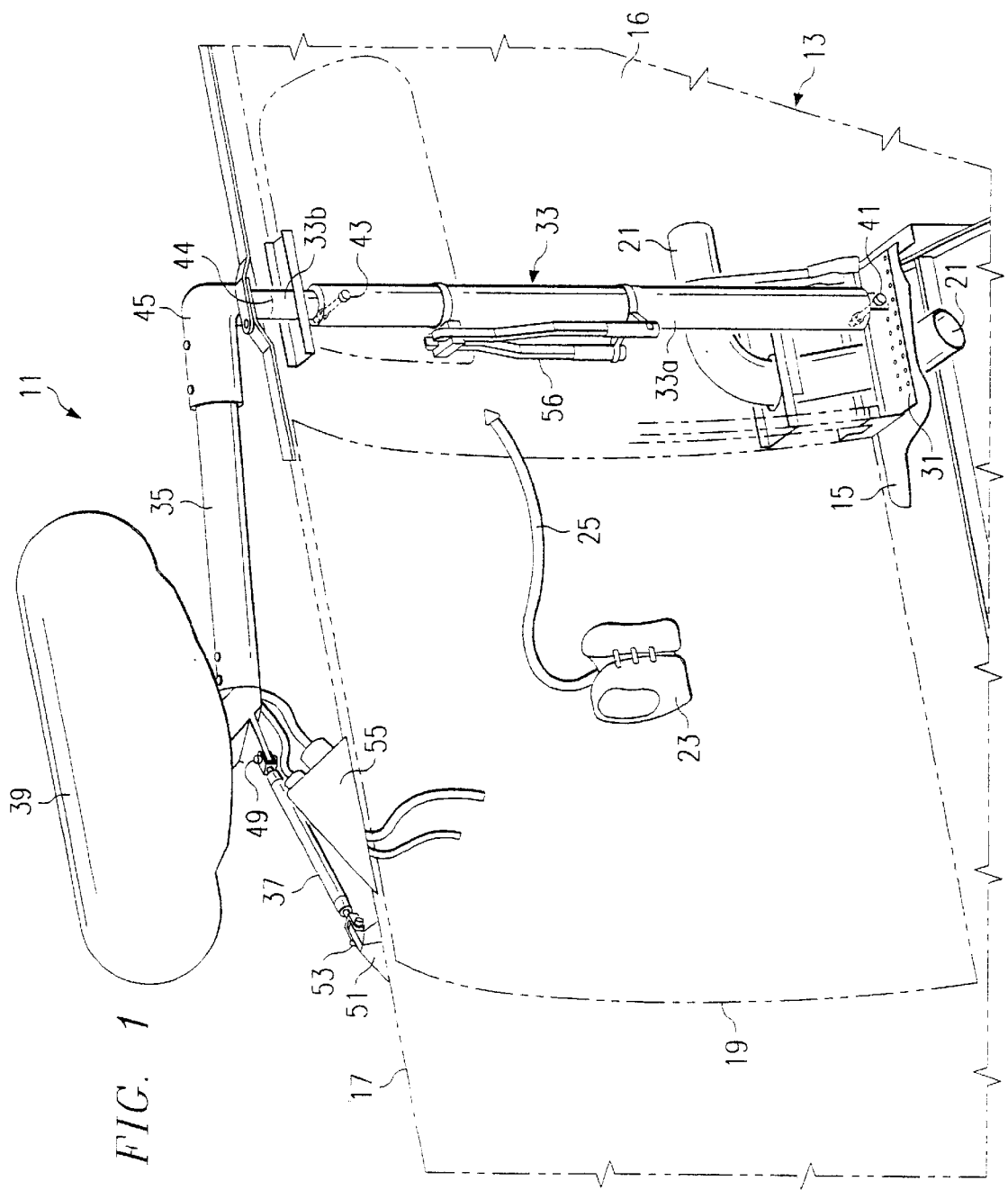
FIG. 1 is a perspective view of the removable hoist apparatus of the present invention installed on an aircraft.

Referring to FIG. 1 of the drawings, numeral 11 illustrates the preferred embodiment of the removable hoist apparatus of the present invention. Removable hoist apparatus 11 is configured for installation into an aircraft 13 having a cabin defined by a floor 15, a fuselage wall 16, a roof 17, and a door 19. Aircraft 13 is preferably a helicopter, but may be any type of aircraft for which a removable hoist apparatus is desired. As is customary, aircraft 13 includes conventional conduits 21 for various control systems under floor 15 and within wall 16. A conventional safety vest 23 is tethered to wall 16 to allow a user (not shown) to safely operate removable hoist apparatus 11.

Removable hoist apparatus 11 includes a base member 31, a mast member 33, a boom member 35, a rigid link member 37, and a conventional hoist assembly 39. Base member 31 is light-weight, preferably weighing about two pounds; therefore, base member 31 is of negligible weight relative to the weight of aircraft 13. Base member 31 is permanently connected to floor 15, and generally has a low profile, so that when removable hoist apparatus 11 is not installed onto aircraft 13, base member 31 does not create an obstruction within the cabin.

Base member. 31 is adapted to receive mast member 33. Mast member 33 is preferably a two-part mast, having a bottom, or lower, portion 33a, and a top, or upper, portion 33b. It is preferably that top portion 33a telescopes into bottom portion 33b; however, it should be understood that mast 33 may be of other configurations, such as a main mast that is adapted to receive a pin or shaft. Bottom portion 33a is releasably secured to base member 31 by a first quick-release fastening means 41. First quick-release fastening means 41 is preferably a conventional nut and bolt passing through base member 31 and bottom portion 33a, but may be another type of fastener, such as a cotter pin. Top portion 33a is releasably secured to bottom portion 33a by a second quick-release fastening means 43. Second quick-release fastening means 43 is preferably a conventional nut and bolt passing through both bottom portion 33a and top portion 33b, but may be another type of fastener, such as a cotter pin.

Top portion 33b extends upward from bottom portion 33a and through an opening 44 in roof 17. Opening 44 is preferably a small aperture, requiring only minimal reinforcement and structural modification to aircraft 13.

Figure 2:
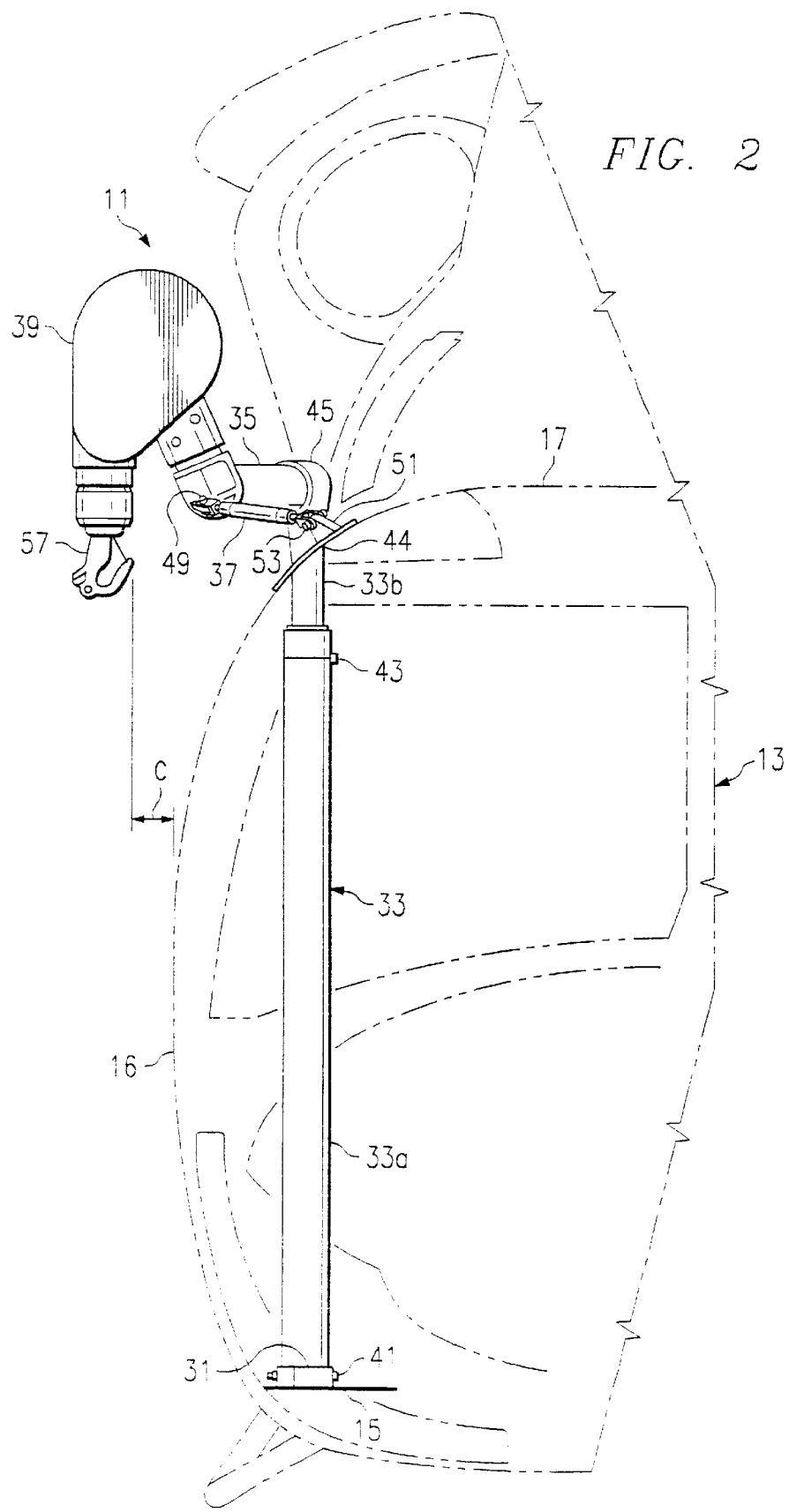
FIG. 2 is a front view of the removable hoist apparatus of FIG. 1.
Figure 3:
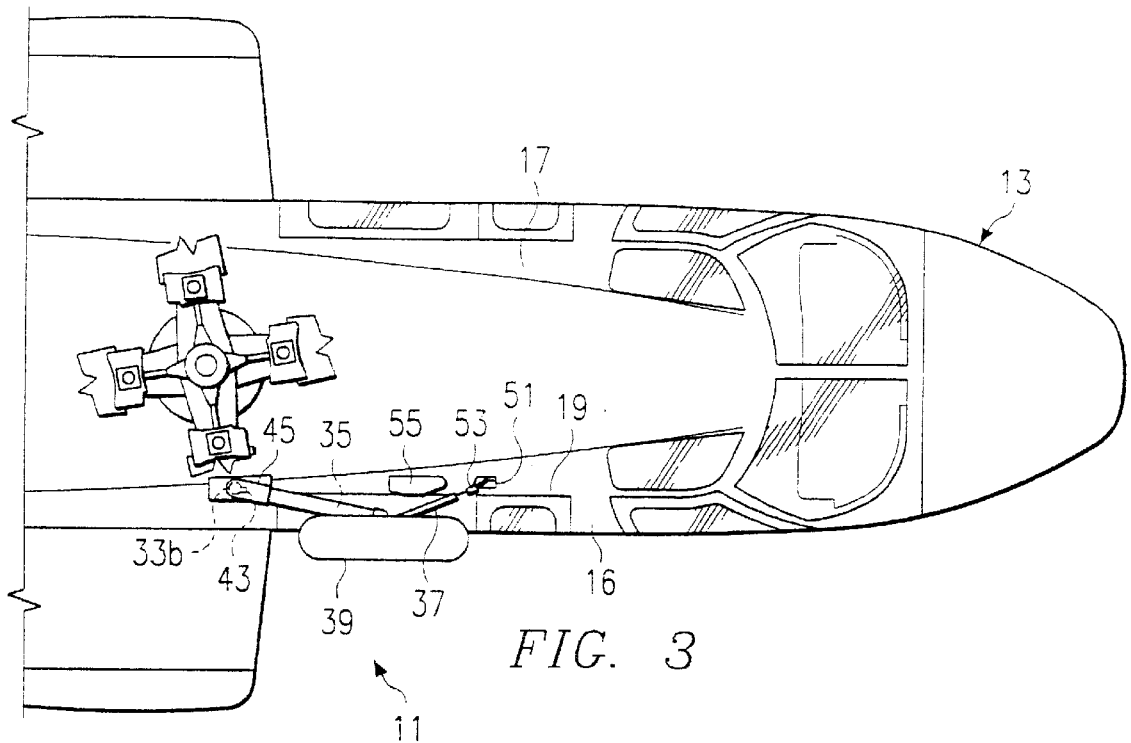
FIG. 3 is a top view of the removable hoist apparatus of FIG. 1.

Boom member 35 is connected to top portion 33b, preferably via a shoulder member 45. Shoulder member 45 generally forms a right angle, such that boom member 35 may remain generally horizontal while top portion 33b remains generally vertical. Although boom member 35, shoulder member 45, and top portion 33b are shown as three separate components, it should be understood that boom member 35, shoulder member 45, and top portion 33b may all be integral into a single L-shaped boom member 35, in which top portion 33b is an integral pin adapted to be received by bottom portion 33a. Boom member 35 extends outward from aircraft 13, but preferably only enough to provide clearance between hoist assembly 39 and wall 16. This is best seen in FIGS. 2 and 3. Maintaining boom member 35 and hoist assembly 39 near aircraft 13 minimizes the drag associated with removable hoist apparatus 11. Link member 37 serves as a tie rod between boom member 35 and aircraft 13. Link member is pivotally coupled to boom member 35 by a pin 49. A mounting means 51 is disposed on aircraft 13, preferably above door 19. Link member 37 is pivotally coupled to mounting means 51 by a third quick-release fastening means 53. Third quick-release fastening means 53 is preferably a conventional nut and bolt passing through both mounting means 51 and link member 37, but may be another type of fastener, such as a cotter pin.

Hoist assembly 39 is carried by boom member 35. It should be understood that link member 37 may also carry a portion of hoist member 39. Hoist member 39 is preferably a conventional electromechanical hoist assembly, but hoist assembly 39 may be powered by other means, such as hydraulics. Hoist assembly 39 receives power from the existing power systems (not shown) of aircraft 13. A housing 55 is installed near hoist assembly 39 to cover power transmission lines extending from the existing power plants of aircraft 13 to hoist assembly 39. Removable hoist apparatus 11, and in particular, mast member 33 is adapted to carry various tools, rescue devices, and supplies, such as tools to aid in releasing first, second, and third quick-release fastening means. For example, bolt cutters 56, may be carried by mast member 33.

Referring now to FIG. 2 in the drawings, removable hoist apparatus 11 is shown in a view from the front of aircraft 13. Hoist assembly 39 includes a conventional hook 57 for attachment to cargo or a rescue device for rescuing people. As is shown, a clearance c is maintained between hoist assembly 39 and wall 16 of aircraft 13. Because hoist assembly 39 is located above roof 17, hoist assembly can hoist cargo or people to a height sufficient to be loaded into aircraft 13 through door 19. As is also shown, it is preferable that mast member 33 be located adjacent to wall 16 so that when removable hoist apparatus 11 is installed onto aircraft 13, removable hoist apparatus 11 utilizes minimal cabin space.

Figure 4:
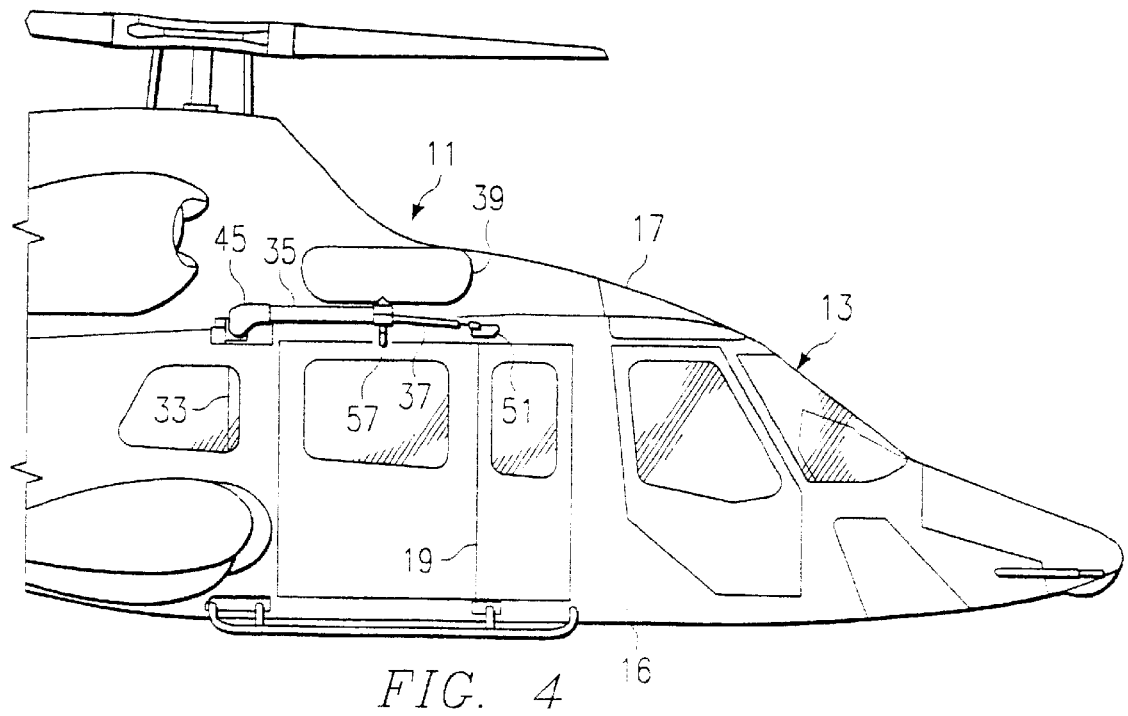
FIG. 4 is a side view of the removable hoist apparatus of FIG. 1.

Referring now to FIGS. 3 and 4 in the drawings, removable hoist apparatus 11 is shown installed in a helicopter in a top view and a side view, respectively. As is shown, when removable hoist apparatus 11 is installed in aircraft 13, some components of removable hoist apparatus 11 are located within the cabin and some components of removable hoist apparatus 11 are located exterior to aircraft 13. Nevertheless, the components of removable hoist apparatus 11 that are located within the cabin of aircraft 13 only occupy minimal cabin space, and the components of removable hoist apparatus 13 located exterior to aircraft 13 are located such that drag is minimized.

It should be understood that removable hoist apparatus 11 may installed on new aircraft during manufacture, or may be installed on an existing aircraft as a retrofit kit. To install removable hoist apparatus 11 on an existing aircraft 13, the following steps are taken. Base member 31 is permanently connected to floor 15 of aircraft 13, and mounting means 51 is mounted to the exterior of wall 16 or roof 17 of aircraft 13. Base member 31 and mounting means 51 are the only components of removal hoist apparatus that are required to be permanently attached to aircraft 13. It will be understood that the weight of base member 31 and mounting means 51 are negligible relative to the weight of aircraft 13; therefore the performance of aircraft 13 is not effected by the installation of base member 31 or mounting means 51. Then, a small opening 44 is made in roof 17. Opening 44 is only large enough to allow top portion 33b of mast member 33 to pass through. Opening 44 is reinforced by such conventional means as require only minimal structural modifications to aircraft 13.

It is preferred that top portion 33b, shoulder member 45, boom member 35, link member 37 and hoist assembly 39 be preassembled and ready for installation. It is an important advantage that so many components of removable hoist apparatus 11 may be preassembled. This advantage makes removable hoist apparatus 11 ideally suited as a rescue assembly for use in emergency rescue operations in which time is of the essence.

Next, bottom portion 33a of mast member 33 is placed in base member 31 and releasably secured thereto by first quick-release fastening means 41. Then, top portion 33b is inserted through opening 44 and received by bottom portion 33a. Top portion 33a is releasably secured to bottom portion 33a by second quick-release fastening means 43. Next, link member 37 is releasably secured to mounting means 51 on aircraft 13 by third quick-release fastening means 53. Thus installed, removable hoist apparatus 11 is ready for use in loading cargo or people into aircraft 13 through door 19. Removable hoist apparatus 11, configured in this manner, can hoist up to 600 pounds of cargo or people. Removable hoist apparatus 11 may be quickly and easily removed from aircraft 13 by simply releasing first quick-release fastening means, second quick-release fastening means, and third quick-release fastening means. Then top portion 33b is lifted away from bottom portion 33a and out through opening 44, and bottom portion 33a is removed from base member 31.

It should be apparent that removable hoist apparatus 11 may be incorporated onto aircraft 13 during original manufacture. In such a case, it would be beneficial for base member 31 to be integral with floor 15, mounting means 51 to be integral with wall 16, and opening 44 to be manufactured with the requisite structural reinforcement.

It should be apparent from the foregoing that an invention having significant advantages has been provided. The removable hoist of the present invention is lightweight, takes up minimal space in an aircraft, can be installed with minimal modifications to the aircraft, and can be quickly and easily removed without altering the performance of the aircraft. While the invention is shown in only one of its forms, it is not just limited but is susceptible to various changes and modifications without departing from the spirit thereof.

I claim:

1. An apparatus for hoisting cargo into an aircraft, the apparatus comprising:

a base member configured to be coupled to the aircraft;

a mast member releasably coupled to the base member by a quick release mechanism;

a boom member releasably coupled to the mast member;

a mounting means configured to be coupled to the aircraft, the mounting means being coupled to the boom member; and a hoist assembly carried by the boom member.

2. The apparatus according to claim 1, wherein the mast member, the boom member, and the hoist assembly are removable from the aircraft.

3. The apparatus according to claim 1, wherein the base member and the mounting means have negligible weight relative to the weight of the aircraft.

4. The apparatus according to claim 1, further comprising:

a rigid link member releasably coupled to the mounting means and the boom member.

5. The apparatus according to claim 1, wherein the apparatus is configured to extend from inside a cabin of the aircraft to outside the cabin.

6. The apparatus according to claim 1, wherein the mast member comprises:

a bottom portion releasably coupled to the base member; and a top portion releasably connected to the bottom portion;

the top portion being coupled to the boom member.

7. The apparatus according to claim 6, further comprising:

a shoulder member disposed between the boom member and the top portion.

8. The apparatus according to claim 1, wherein the hoist assembly includes an electromechanical hoist configured to be powered by a power source on the aircraft.

9. The apparatus according to claim 1, wherein the hoist assembly is capable of hoisting 600 pounds.

10. The apparatus according to claim 1, wherein the aircraft is a helicopter.

11. The apparatus according to claim 10, wherein the mast member is configured to be located within a cabin of the aircraft adjacent a passenger door, such that the hoist assembly is located above the passenger door.

12. The apparatus according to claim 1, further comprising:

a rescue device coupled to the hoist assembly for rescuing people;

wherein the hoist assembly is adapted to hoist the rescue device while the aircraft hovers.

13. A method of hoisting cargo into an aircraft, the method comprising the steps of:

connecting a base member to the aircraft;

providing a mast member that is adapted to be repeatedly coupled to and removed from the base member;

removably coupling the mast member to the base member with a quick release mechanism;

removably coupling a boom member to the mast member;

coupling a tie rod to the boom member;

removably coupling the tie rod to the aircraft with a quick release mechanism;

connecting a hoisting assembly to the boom member, such that the hoisting assembly is located above a door to the aircraft;

connecting the cargo to the hoisting assembly;

hoisting the cargo up toward the hoisting assembly until the cargo is adjacent to the door of the aircraft;

moving the cargo into the aircraft; and disconnecting the hoisting assembly from the cargo.

14. The method according to claim 13, wherein the aircraft is a helicopter.

15. The method according to claim 13, wherein the cargo is a person in need of rescue.

16. A method of converting an existing aircraft into a rescue aircraft, the method comprising the steps of:

connecting a base member to the aircraft;

connecting a mounting means to the aircraft;

providing a rescue assembly having a mast member, the mast member being adapted to be repeatedly coupled to and removed from the base member with a quick release mechanism, a boom member adapted to be releasably coupled to the mast member, a link member connected to the boom member, the link member being adapted to be releasably coupled to the mounting means with a quick release mechanism, and a hoist member carried by the boom member; and releasably coupling the mast member to the base member with the quick release mechanism;

releasably coupling the boom member to the mast member; and releasably coupling the link member to the mounting means with the quick release mechanism;

thereby releasably coupling the rescue assembly to the aircraft.

17. The method according to claim 16, wherein the existing aircraft is a helicopter.

18. A cargo hoisting apparatus for hoisting cargo comprising:

an aircraft having a fuselage with an opening; and a hoist assembly releasably coupled to the fuselage near the opening, the hoist assembly comprising:

a base member coupled to the fuselage;

a mounting means coupled to the fuselage;

a mast member releasably coupled to the base member by a quick release mechanism;

a boom member releasably coupled to the mast member by a quick release mechanism;

a link member releasably coupled to the mounting means by a quick release mechanism, the link member also being coupled to the boom member; and a hoist assembly carried by the boom member.

19. The cargo hoisting apparatus according to claim 18, wherein the aircraft is adapted to hover over the cargo to be hoisted.

20. The cargo hoisting apparatus according to claim 18, wherein the hoist assembly is operable while the aircraft is in flight.

\* \* \* \* \*